C. E. BRIGHT.
TIRE.
APPLICATION FILED SEPT. 16, 1910.

1,090,195.

Patented Mar. 17, 1914.

Witnesses
Evan Evans
A. L. Phelps

Inventor
Colonel E. Bright
By
C. C. Shepherd
Attorney

UNITED STATES PATENT OFFICE.

COLONEL E. BRIGHT, OF COLUMBUS, OHIO.

TIRE.

1,090,195.  Specification of Letters Patent.  Patented Mar. 17, 1914.

Application filed September 16, 1910. Serial No. 582,294.

*To all whom it may concern:*

Be it known that I, COLONEL E. BRIGHT, a citizen of the United States, residing at Columbus, in the county of Franklin and State of Ohio, have invented certain new and useful Improvements in Tires, of which the following is a specification.

This invention relates to tires, and has particular application to certain novel and useful improvements in pneumatic tires adapted particularly for use in connection with motor vehicles and the like.

In carrying out my invention, it is my purpose to provide a tire of the class described comprising in its structure an ordinary outer casing or tread member, an inner casing, preferably reinforced as hereinafter described, and means within the inner casing for supporting the latter against the various strains and pressures to which the tire is subjected when in use, said members also acting as agents to sustain the tire in case of punctures or other injuries.

With the above recited objects and others of a similar nature in view, my invention consists in the construction, combination and arrangement of parts set forth in and falling within scope of the appended claims.

Figure 1:
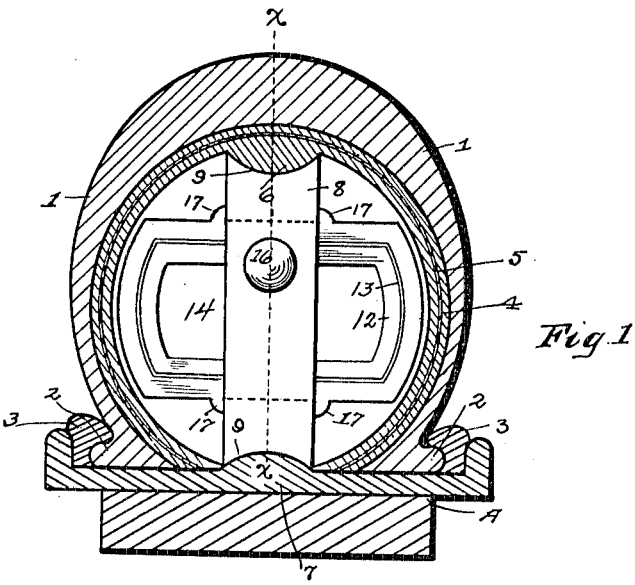
Figure 2:
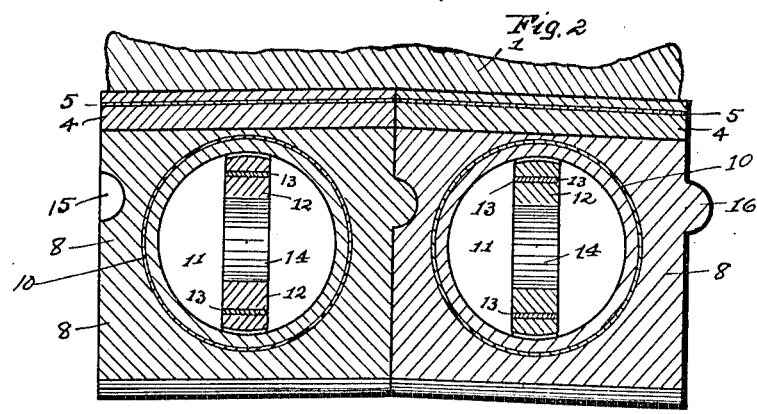
Figure 3:
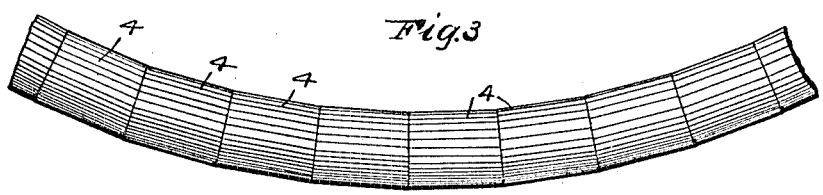

In the accompanying drawings—Figure 1 is a transverse vertical sectional view taken through a tire embodying my improvements, and looking at the end of one of the inner sections thereof. Fig. 2 is a longitudinal sectional view through a portion of a tire on the line *x—x* of Fig. 1, said view being slightly reduced, and, Fig. 3 is a view in elevation of a portion of the interior of the tire, showing the sections as assembled.

Referring now to the accompanying drawings in detail, the letter A designates the rim or felly of the wheel, to which is secured the outer casing 1 of the tire, the latter being provided with the usual peripheral flanges 2, said casing and its contained parts being secured in position, in any ordinary or well known manner, preferably detachably through the medium of the rings or strips 3, commonly made in two semi-circular sections hingedly connected together and drawn to position by the usual tie bolt fitting within the flanged rim A and engaging with the flanges 2. It is of course to be understood that the outer casing is constructed of the usual materials of rubber and canvas. Within this casing 1 is contained the inner sections of the tire, and in describing the invention I will confine myself to an explanation of the construction of one of said sections, as it will be understood that all of said sections are similar.

Each section comprises a partially tubular body of suitable resilient material, such as rubber and canvas, as indicated at 4, the tubular section being reinforced by the circular metallic plate 5 contained therein. Extending radially, inward of the inner walls of the section, are the beads or ribs 6 and complemental thereto are ribs 7 on the rim A coactively adapted to form bearings and retaining members for the rubber blocks 8, the latter being cut away or grooved as at 9, to receive and seat the ribs or beads 6 and 7. The block 8 is also reinforced by means of a ring or band of metal 10, and each block is formed with a central opening or hole 11 through which extends a second rubber block 12, the latter being also preferably reinforced by means of the metallic plate or ring 13, said block 12 also having an opening 14 formed therein, so that the desired degree of flexibility of the entire section may be attained. In order to assemble the inner sections of the tire in a unitary body, each of the blocks 8 is provided with a recess or socket 15, at one side thereof, and a lug or projection 16 disposed oppositely to said recess, so that when the sections are assembled the projection 16 of one section will seat within the recess 15 of the adjacent and contacting section. In order to retain the interior block 12, in position within the block 8, I preferably provide a series of integrally depressible lugs 17 arranged at the top and bottom sides of the block, so that in the process of inserting the block 12 within the member 8, the lugs 17 are compressed sufficiently to fit within the opening 11 and are then permitted to spring outward against the wall of the opening whereby the block 12 will be securely retained in position.

From the above description, taken in connection with the accompanying drawings, the construction, operation and manner of assembling my improved tire, will be apparent. The interior blocks 12, are sprung within the blocks 8, with the retaining lugs 17 engaging the wall of the opening 11, and the two sections or blocks 8 and 12 are then inserted within the tubular sections 4, the latter assembled as shown in Fig. 3, with the lugs 16 of one section seating and interlocking with the sockets or recesses 15 of the adjacent section. The inner tire is then placed within the outer casing 1 and the latter mounted upon the rim or felly in the well known manner, as is illustrated in Fig. 1.

As previously reiterated, the structure of my improved form of tire comprises a continuous outer tread and a plurality of inner sections or units, each disposed end to end in interlocking relation. Each of these units comprises a partially tubular external member, oblong blocks extending the full length of their partial tubular inclosing members and having depressions in one end with lugs in their other end. These oblong block members have circular apertures for the reception of transverse oblong blocks, having central and rectangular cutaway portions and having integral resilient external lugs to form catches. It will be understood that the outer inclosing member is mostly of resilient material, such as rubber and canvas, and that both the oblong and transverse blocks are likewise mainly of rubber.

It will be noted that I have provided a form of tire, which while it embraces many of the advantageous features of the ordinary pneumatic tire, such as resiliency and the like, it is not so liable to be subjected to deflation or collapse through cuts, punctures and other injuries. It will further be seen that should the tire be punctured or cut, it will not completely collapse as is the case with the ordinary pneumatic tire, but the outer casing or tread member of the tire will be supported and sustained through the flexible inner sections reinforced in the manner heretofore described.

A further advantage incident to my construction of tire, is that by reinforcing the inner sections, and the cushioning blocks by the metallic bands or rings, I greatly lengthen the life of the tire and at the same time further reduce the liability of the tire being injured through cuts, punctures and the like.

While I have herein shown and described one particular embodiment of my invention, I wish it to be understood that I do not limit myself to all the precise details of construction set forth herein by way of illustration, as modification and variation may be made without departing from the spirit of the invention or exceeding the scope of the claims.

What I claim, is—

1. In a vehicle wheel, the combination with the felly, of an outer casing mounted thereon, a series of tubular members located within said outer casing, cushioning blocks within said tubular members extending longitudinally thereof and having circular openings therein, and second cushioning blocks seated transversely within said circular openings and engaging the walls of said members.

2. In a vehicle wheel, the combination with the felly, of an outer casing mounted thereon, a series of tubular members located within said outer casing, each member being reinforced by a metallic band, ribs extending inward of the tubular sections, cushioning blocks within said tubular members and having circular openings therein, and second cushioning blocks seated transversely within said circular openings and engaging with the walls of said openings.

In testimony whereof I affix my signature in presence of two witnesses.

COLONEL E. BRIGHT.

Witnesses:
 JOSEPH P. EAGLESON,
 C. C. SHEPHERD.

Copies of this patent may be obtained for five cents each, by addressing the "Commissioner of Patents, Washington, D. C."